United States Patent [19]

Schmitz et al.

[11] Patent Number: 4,497,579
[45] Date of Patent: Feb. 5, 1985

[54] MIXING HEAD FOR REACTIVE MATERIALS

[75] Inventors: Horst Schmitz, München; Wolfgang Krompass, Inning, both of Fed. Rep. of Germany

[73] Assignee: Krauss-Maffei Aktiengesellschaft, Munich, Fed. Rep. of Germany

[21] Appl. No.: 543,123

[22] Filed: Oct. 18, 1983

Related U.S. Application Data

[63] Continuation-in-part of Ser. No. 381,740, May 24, 1982, Pat. No. 4,464,056.

[30] Foreign Application Priority Data

May 22, 1981 [DE] Fed. Rep. of Germany ..... 31204821

[51] Int. Cl.³ ............................................. B01F 5/04
[52] U.S. Cl. .................................... 366/134; 366/159; 366/189; 366/193; 222/309; 422/131; 425/205
[58] Field of Search ................ 222/255, 278, 309; 264/328.6; 366/134, 136, 137, 159, 176, 179, 182, 184, 189, 193, 332, 333, 334; 422/131, 133, 135; 425/149, 205, 207, 376 A, 543, 561

[56] References Cited

U.S. PATENT DOCUMENTS

| 3,182,971 | 5/1965 | Wakeman et al. | 366/332 |
| 3,975,128 | 8/1976 | Schlüter | 425/200 |
| 4,418,041 | 11/1983 | Johnson et al. | 366/159 |
| 4,464,056 | 8/1984 | Schmitz et al. | 366/134 |

FOREIGN PATENT DOCUMENTS

| 2327269 | 5/1974 | Fed. Rep. of Germany . |
| 2065841 | 5/1976 | Fed. Rep. of Germany . |
| 2612812 | 9/1977 | Fed. Rep. of Germany . |
| 2544749 | 10/1977 | Fed. Rep. of Germany . |
| 3040922 | 5/1982 | Fed. Rep. of Germany . |

Primary Examiner—Philip R. Coe
Assistant Examiner—Arthur D. Dahlberg
Attorney, Agent, or Firm—Karl F. Ross; Herbert Dubno

[57] ABSTRACT

A mixing head for two reactive components has a mixing chamber provided with a control plunger enabling recirculation and opening at right angles into a quieting passage which is provided with a control plunger adapted to selectively obstruct the outlet of the mixing chamber into the quieting passage. According to the invention an adjustable abutment is provided for the latter plunger to enable the obstruction to be completely removed during one phase of each cycle of the actuation of the apparatus. This abutment can be an annular piston under the control of fluid pressure.

10 Claims, 2 Drawing Figures

U.S. Patent  Feb. 5, 1985  4,497,579
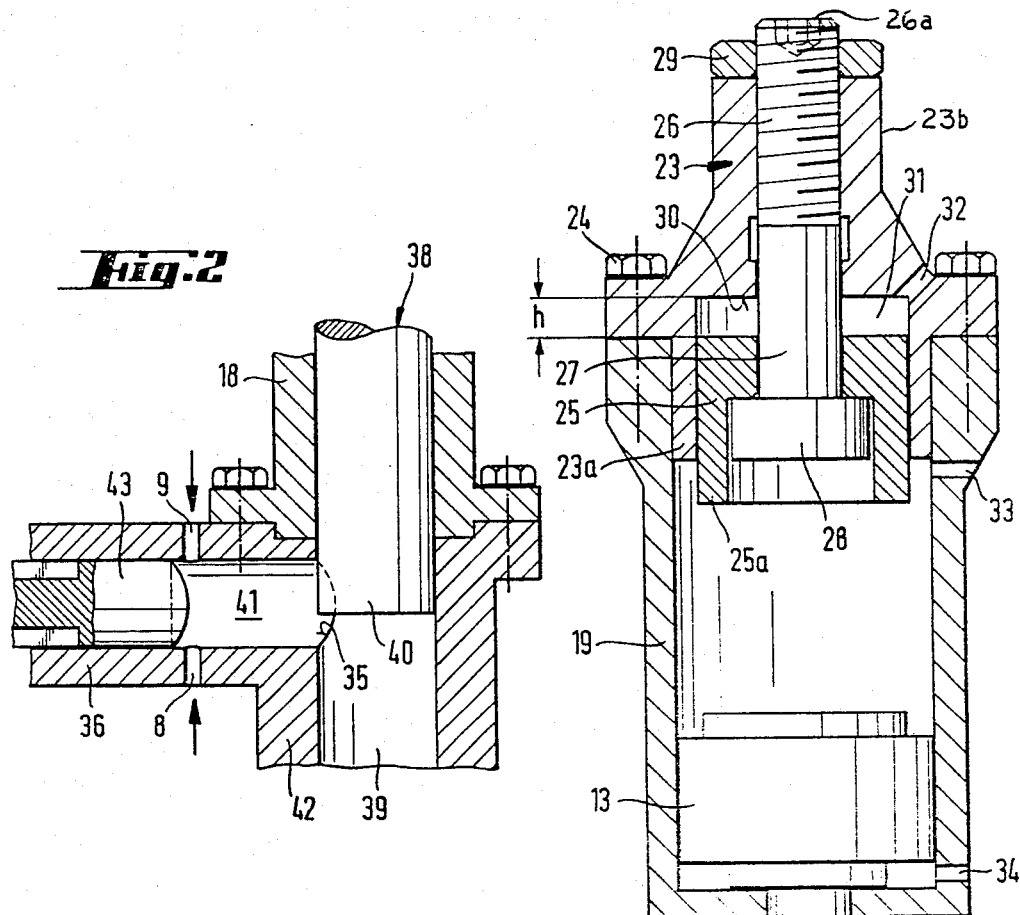
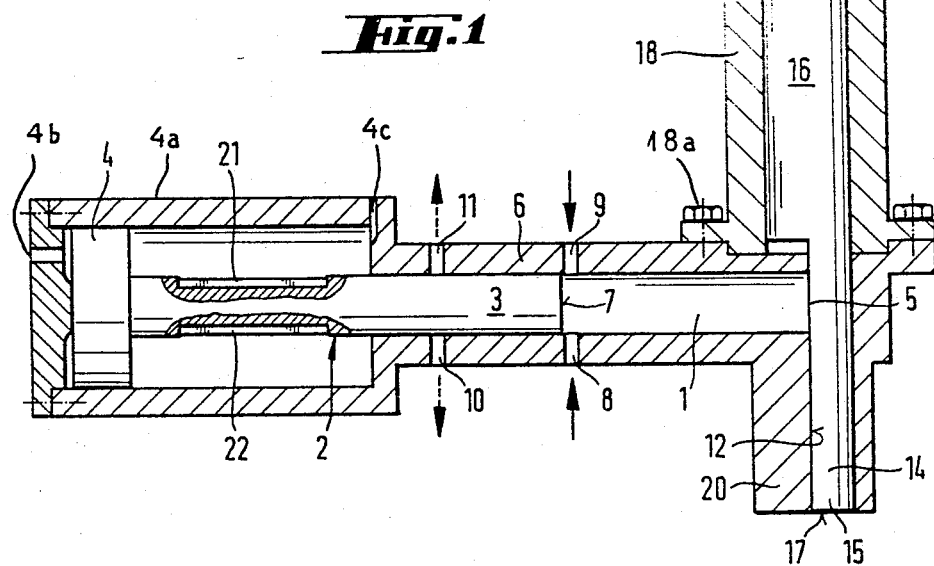

MIXING HEAD FOR REACTIVE MATERIALS

CROSS REFERENCE TO RELATED APPLICATION

This application is a continuation-in-part of our copending application Ser. No. 06/381,740, now U.S. Pat. No. 4,464,056, filed May 24, 1982.

FIELD OF THE INVENTION

Our present invention relates to a mixing head for chemically reactive components of a reaction mixture and especially components of a synthetic resin mixture which are adapted to react in a setting-type, polymerization or cross-linking reaction. More particularly, the invention relates to a mixing head of the kind which utilizes a mixing chamber from which material is displaced by a plunger, ram or piston into a mold or other space. The invention is especially related to a mixing head of this type in which recirculation of the reactive components is effected.

BACKGROUND OF THE INVENTION

The aforementioned copending application refers to the commonly owned U.S. Pat. Nos. 3,799,199, 3,975,128, 3,706,515, 3,954,926 and 4,226,543 and other publications mentioned in that application for background in systems for bringing about the mixture of two or more reactive components in a mixing chamber prior to or concurrently with the expulsion of said materials into another vessel, e.g. a mold. In the production of polyurethane, for example, a di-isocyanate or polyisocyanate component is reacted with a diol or polyol component to produce the settable reaction mixture by separately feeding these components into a mixing chamber and displacing the intimately formed mixture from the chamber into a mold in which the mixture can be set. Such mixing heads may also be used in the dispensing of the reactive mixture for other purposes as well and, in general, for any system requiring the combination of two or more components to form a reaction mixture.

In general, the conditions under which two components are mixed require that the two components be held separate from one another until the instant at which they enter the mixing chamber, since any premature contact of the two components with one another will result in setting. Such premature contact may result in the reaction of the two components to form a hardenable mass obstructing further outflow of one or both of the components of the mixture. In order to prevent obstruction of the passages, both components are generally provided in a highly flowable form and are circulated by pumps or the like through the control plunger, piston or ram in one position of the latter, entering the mixing chamber only after retraction of this control member into another position.

It is also important, to avoid the need to clear out solidified products and to permit reuse of the head, to provide the plunger, piston or ram so that it completely expels the reaction mixture from the mixing chamber. It has already been noted that this mixing chamber can open directly into a mold or other vessel.

It has been found, in some cases, to be advantageous to discharge this chamber into a duct leading to a mold and at substantially right angles to the mixing chamber, this duct being provided in turn with a second piston, plunger or ram to drive the mixture out of the channel. Particular reference may be had to U.S. Pat. No. 3,975,128 and the German Pat. No. 2,327,269 in this regard.

Both of these publications deal with a high pressure mixing head in which the additional channel has the effect of quieting the highly turbulent mixture driven from the mixing chamber into this channel. The quieting channel is comparatively narrow and long and the second piston serves to clear the channel at the end of each mixing phase and thus prevents the channel from being plugged up by the reaction mixture. It is known in other mixing heads to control the pressure in the mixing chamber and to regulate the precise metering or reaction of the material, especially with small dispensed quantities per operation (e.g. several grams per cycle), by providing movable displacement bodies in the mixing chamber itself (see German Pat. No. 2,065,841 and Printed German Patent Application-Auslegeschrift No. 2,612,812) downstream of the mixing chamber in the discharge passage (see Printed German Application-Auslegeschrift No. 2,544,749). These systems, however, have various disadvantages. For example, some of them may be excessively space consuming at large for many purposes, and can be expensive and difficult to handle. Others are difficult to control and control systems for them may be expensive. Still others cannot be readily repaired or maintained.

Reference may be had to German Open Application-Offenlegungsschrift No. 3,040,922 which describes a mixing head in which the cleaning plunger has a retracted position in which the mixing chamber outlet opening is partially covered and which thus establishes an adjustable throttle for the reaction mixture leaving the mixing chamber. This arrangement also has a disadvantage, namely that in the region ahead of the mixing chamber outlet at the cleaning plunger, residues of the mixture can accumulate which can harden to a greater or lesser extent and can be entrained directly or subsequently into the mold cavity and thereby detrimentally affect the quality of the product.

This problem was also recognized in the aforementioned application which provided a modification of the system of U.S. Pat. No. 3,975,128, so that directly at the mixing chamber outlet opening, a filler body or cleaning plunger is provided which partly obstructs the outlet opening of the mixing chamber in the discharge phase, i.e. while the mixture is forced by the first plunger from the mixing chamber into the channel at right angles thereto. In this approach, a stop is provided for the second piston (cleaning plunger) which is adjustable to control the degree of obstruction of the mixing chamber opening and to hold the piston so that a predetermined amount of the free end of the piston or plunger projects across the mixing chamber opening or such that the obstructing body lies at a preferably adjustable location downstream of the mixing chamber opening.

The second piston or plunger has, in addition to its final or cleaning function, the additional function of serving as a filler body to partially fill the flow passage for the mixture and to constitute a body of predetermined but adjustable volume at this location.

This arrangement eliminates the need for a separate filling body and the means for positioning a separate filling body or adjusting the position of the separate filling body.

In that system, moreover, the obstructing body has an adjustable stop which can limit the displacement of the second piston in its retracted position. This adjustable stop can be a screw or the like and provides extremely simple means for setting the throttle in position of the obstructing body.

The second piston is displaceable by fluid pressure between its forward and retracted positions and the abutment is so arranged that it engages directly a fluid pressurizable surface of the second piston.

According to yet another feature of the earlier application, the second piston and its actuator has between them a device provided for the selective displacement of the second piston relative to the actuating member so that the maximum stroke of the second piston is substantially equal to the length and the direction of the stroke of a mixing chamber outlet opening. This adjustment means between the second piston and the actuating member can be a hydraulically...

tion, in a mixing head of the type described in the aforementioned copending application and adapted to form a mixture of chemically reactive materials and especially from at least two components of a synthetic resin mixture which is hardenable. The basic elements of the apparatus thus include the basic elements in the aforementioned copending application, namely, a mixing chamber in which a first piston is displaceable axially to form a control element and which is displaceable in turn between a forward position in which recirculation of the reaction components through the piston is permitted and all of the contents of the mixing chamber is permitted expelled, and a second... inlets for...

described utilized a fixed abutment and a movable member on the second or working piston, the arrangement of the present invention allows the second or working piston to be greatly simplified and merely provides a third or abutment piston in conjunction with a threaded bolt forming the throttle adjustment.

In the retracted position, the abutment can be formed by the piston which can be driven by the fluid pressure medium to lie against the head and the nullification of the throttling operation can be effected by depressurizing this piston and allowing the second or working piston to abut the head of the bolt directly or the end of the abutment piston which can, in turn, engage the bottom of the latter cylinder.

BRIEF DESCRIPTION OF THE DRAWING

The above and other objects, features and advantages of the present invention will become more readily apparent from the following description, reference being made to the accompanying drawing in which:

FIG. 1 is an axial cross-sectional view through a mixing head provided in accordance with the present invention from a mixing chamber transverse to a quieting passage having a cleaning plunger; and FIG. 2 is a cross-sectional view showing a modification of the junction between the mixing chamber and the passage of the embodiment of FIG. 1.

SPECIFIC DESCRIPTION

The mixing head shown in FIG. 1 comprises a mixing chamber 1 adapted to generate, for example, a polyurethane mixture from two synthetic resin components which can be combined to form this settable composition. According to the principles described in the aforementioned copending application, this mixing chamber can be provided with a control element 2 having a plunger 3 at its right-hand end and a first piston 4 at its left-hand end for actuating same. The piston 4 is axially displaceable in a double acting cylinder 4a provided with fluid passages 4b and 4c for connecting the system to a control arrangement adapted to actuate the control element 2 in the manner described in the aforementioned patents.

The mixing chamber 1 is provided at its right-hand end with an outlet 5 with which the end face 7 of the plunger 3 can become flush when the control element 2 is displaced to the right, thereby driving any residues of the mixture out of the mixing chamber while blocking the connection between the inlet ports 8 and 9 for the reactive components with the mixing chamber.

In addition, the mixing chamber housing 6 is provided with a pair of outlets 10 and 11 connected in recirculation paths for the reactive components while the control element 2 is provided with a pair of passages 21 and 22 so that, when the control element 2 is in its right-hand position, the two components circulate from their inlet ports 8 and 9 through the respective passages 22 and 21, via the return ports 10 and 11 in appropriate recirculation paths. The principles of this recirculation have been described in the aforementioned copending application as well as in U.S. Pat. No. 3,975,128.

At an angle to this mixing chamber, and ahead of the outlet 5, we provide a passage 12 at an angle of 90° to the mixing chamber, the passage 12 serving as a quieting for the turbulent mixture generated in the mixing chamber. From the passage 12, the mixture can be discharged directly or indirectly into a mold cavity.

The passage 12 has a semicircular cross section as shown and this passage can also be connected to a pipe or other conduit for connection to a mold cavity or for directing the mixture elsewhere.

The passage 12 receives a cleaning plunger 14 which is axially shiftable therein from a forward position illustrated in FIG. 1 in which its lower end lies flush with the passage outlet 17 to ensure that the portion 15 of the plunger not only blocks the outlet 5 but also has driven any residues of the mixture from the passage.

As a consequence, no residues can remain in the mixing chamber or in the passage.

The cleaning plunger 14 is also of the semicircular cross section and has a connecting shank 16 of circular cross section joining it to the second or working piston 13 which is axially displaceable in the cylinder formed by the housing 19. The passages 33 and 34 serve to supply hydraulic or pneumatic medium to this cylinder to displace the working piston 13 and the cleaning plunger 14.

The housing 19 has its upper portion connected by bolts 24 to a cover 23 and its lower portion 18 and connected by bolts 18a to the housing portion 20 of the cleaning plunger.

The cover 23 has a downwardly extending cylindrical boss 23a which forms a cylinder for an annular piston 25, i.e. the third or abutment piston whose face 25a forms a stop for the upper end of the working piston 13.

The cover 23 also has an axially extending cylindrical portion 23b which is internally threaded and receives the threaded end 26 of a bolt 28 whose unthreaded shank 27 passes through the annular piston 25.

The outwardly projecting end 26a of the bolt is provided with a hex socket adapted to receive an allen wrench or other actuating tool enabling adjustment of the position of the head of the bolt and thereby controlling the degree of throttling of the cleaning plunger in its retracted position. The position of the bolt 28 can be locked by a counter nut 29.

Between the floor of the cylinder 31 and the end of the annular piston 25, a working compartment of the cylinder is provided which can be pressurized or depressurized through a passage 32 and which define a maximum stroke h which is adjustable as previously indicated.

The working or second piston 13 can be displaced downwardly by a pressure medium introduced through the passage 33 or upwardly by a pressure medium introduced through the passage 34.

If the working piston 13 is shifted from the positions shown in FIG. 1, which it has assumed at the end of a preceding working cycle, having discharged all residues of the reaction mixture from the passage 12, it can be shifted upwardly until it engages the abutment surface 25a which is held in the position illustrated in FIG. 1 by fluid medium within the cylinder 31. The outlet 5 is here partially obstructed by the end of the plunger 14 which forms a throttle and, upon retraction of the control element 2 into the position illustrated, the reactive components can pass from the mixture 1 at high pressure into the mold cavity. The partial obstruction ensures effective mixing and the mixture is directed along a path including an angle of 90° into the path 12 in which a quieting effect occurs as the mixture can pass in laminar flow from the outlet 17 into the mold cavity.

At the end of the mixing process, the plunger 3 is driven to the right by the first piston 4 with three distinct effects.

Firstly the connection between the inlet orifices 8 and 9 and the mixing chamber 1 is interrupted and the components are recycled through the passages 21 and 22 in the manner described (recirculation).

Secondly, any mixtures of the residue within the chamber 1 are driven past the outlet 5.

Finally, and simultaneously, any mixture residues on the wall of the chamber 1 are scraped free by the plunger 3.

Simultaneously with the displacement of the plunger 3 to the right, the throttle effect is relieved. This is accomplished by venting the chamber 31 or draining the same via the passage 32, thereby allowing the plunger 14 to move upwardly and eliminate the obstruction to the outlet 5.

Because the outlet 5 is fully unblocked, the two latter effects of the plunger 3 are facilitated and especially the stripping of mixture residues from the wall of the chamber 1 is improved since such residues may have accumulated at the upstream side of the throttle.

The uppermost position of the plunger 15 is reached when its piston 13 in contact with the surface 25a drives the annular piston 25 against the surface 30 of the housing. In this position, the end of the plunger 14 completely clears the outlet 5.

The degree to which the outlet 5 is obstructed by the end 15 of the plunger 14 can be controlled by adjusting the bolt 80. This can increase or reduce the stroke h and hence the point at which the abutment surface 25a encounters the first piston 13.

It may be advantageous to provide a compression spring, e.g. a stack of Belleville washers as in the aforementioned copending application, between the surface 30 and the annular piston 25 to bias the latter downwardly.

In this case, if a constant pressure is maintained via passage 33 above the second piston 13 and below the annular piston 25, the pressure applied to the piston 13 via passage 34 can control all of the positions of the plunger 14, including the throttle-relief position.

FIG. 2 shows to a slightly different scale from FIG. 1, a modification of the junction between the mixing chamber and the passage. In this embodiment, the mixing chamber 41 receives a plunger 43 which can be cylindrically concave in the direction of the cleaning plunger 38 whose end 40 forms an adjustable throttle in the manner described. The outlet 35 extends around the periphery of the end 40 of the plunger 38. The mixing chamber housing 38 is integral with the housing 42 of the passage 39 into which the mixture is discharged and the housing 18 for the plunger 38 is bolted thereto. In this embodiment, for promoting the quieting effect, the cross section of the passage 39 is greater than the cross section of the mixing chamber at its outlet 35.

FIG. 2 shows one possible position of the plunger 38 in which it acts as a throttle in the manner described and in this throttle position the lower end 40 of the plunger 38 covers more than half the outlet 35 of the mixing chamber.

We claim:

1. A mixing head for two reactive components comprising:
   means forming an elongated mixing chamber provided with ports for introducing said components into said mixing chamber, and an outlet opening at one end of said mixing chamber;
   a first plunger shiftable in said mixing chamber between a retracted position in which a mixture of said component is formed therein, and a second position wherein said first plunger is advanced to said opening to drive said mixture from said chamber;
   means forming an elongated quieting passage communicating with said mixing chamber at said opening, said passage having a discharge end remote from said opening;
   a second plunger shiftable in said passage between a retracted position wherein said mixture can be discharged through said passage at said discharge end, and an advanced position wherein said second plunger drives said mixture from said passage; and
   a shiftable abutment for said second plunger establishing said reactracted position such that said plunger extends across said opening to partially obstruct flow from said mixing chamber into said passage, and displaceable to enable said second plunger to assume a position in which flow from said outlet is completely unblocked.

2. The mixing head defined in claim 1 wherein said abutment comprises a piston displaceable in a cylinder and defining therewith a working compartment adapted to receive a pressure medium.

3. The mixing head defined in claim 2 wherein an end of said piston forms an abutment directly for said plunger.

4. The mixing head defined in claim 3 wherein said piston is an annular piston, further comprising adjustment means for limiting an axial stroke of said piston.

5. The mixing head defined in claim 4 wherein said adjusting means includes a bolt extending through said piston and having a head limiting the displacement of said piston in one direction, said bolt having a threaded end engaged threadedly in a housing forming said cylinder and rotatable from a location outside said housing to set the degree of throttling of said second plunger.

6. The mixing defined in claim 5 wherein said bolt has a threaded end formed with a hex socket engageable by an allen wrench externally of said housing, said threaded end receiving a counter nut.

7. The mixing head defined in claim 6 wherein said first plunger is provided with a first piston for actuating same, said first plunger being formed with passages for recirculation of said components in the second position of said first plunger.

8. The mixing head defined in claim 7 wherein said second plunger is provided with a second piston axially displaceable in a respective cylinder for shifting said second plunger, said second piston being engageable with said annular piston.

9. The mixing head defined in claim 8 wherein said passage is semicircular in cross section and said second plunger is semicircular in cross section.

10. The mixing head defined in claim 8 wherein said first plunger has a cylindrically concave end.

* * * * *

Notice of Adverse Decision in Interference

In Interference No. 101,473, involving Patent No. 4,497,579, H. Schmitz and W. Krompass, MIXING HEAD FOR REACTIVE MATERIALS, final judgment adverse to the patentees was rendered June 17, 1986, as to claims 1-5.
[*Official Gazette December 2, 1986.*]